(12) United States Patent
Shelon et al.

(10) Patent No.: US 10,713,725 B1
(45) Date of Patent: Jul. 14, 2020

(54) SYSTEM AND METHOD FOR MAXIMIZING PORTFOLIO DIVERSIFICATION

(71) Applicant: JPMorgan Chase Bank, N.A., New York, NY (US)

(72) Inventors: Jonathan Allen Shelon, Scarsdale, NY (US); Hongtao Qiao, White Plains, NY (US); Ignacio J. Bustindui, New York, NY (US); Haoxin David Lu, New York, NY (US); Xinwei Song, New York, NY (US); Jason Chen, Long Island City, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 638 days.

(21) Appl. No.: 14/528,531

(22) Filed: Oct. 30, 2014

(51) Int. Cl.
*G06Q 40/06* (2012.01)
(52) U.S. Cl.
CPC .................. *G06Q 40/06* (2013.01)
(58) Field of Classification Search
CPC ...................................................... G06Q 40/06
USPC ....................................................... 705/36 R
See application file for complete search history.

(56) References Cited

U.S. PATENT DOCUMENTS

| | | | |
|---|---|---|---|
| 7,415,432 B1* | 8/2008 | Gianakouros | G06Q 40/00 705/35 |
| 7,958,038 B2 | 6/2011 | Choueifaty | |
| 8,346,647 B1* | 1/2013 | Phelps | G06Q 40/06 705/35 |
| 8,629,872 B1* | 1/2014 | Phoa | G06T 11/203 345/440 |
| 2008/0222052 A1* | 9/2008 | Choueifaty | G06Q 40/06 705/36 R |
| 2012/0221376 A1* | 8/2012 | Austin | G06Q 40/06 705/7.28 |

* cited by examiner

*Primary Examiner* — Robert R Niquette
*Assistant Examiner* — Liz P Nguyen
(74) *Attorney, Agent, or Firm* — Greenblum & Bernstein, P.L.C.

(57) ABSTRACT

Methods and systems for generating a diversification index for a portfolio are disclosed herein. A plurality of assets within the portfolio are identified, each of the plurality of assets having a corresponding weight value and a corresponding utility value. An overall volatility value of the portfolio is identified. A diversification index is computed based on the overall volatility value and corresponding weight and volatility values of each of the plurality of assets.

18 Claims, 8 Drawing Sheets

SYSTEM AND METHOD FOR MAXIMIZING PORTFOLIO DIVERSIFICATION

TECHNICAL FIELD

Embodiments of the invention relate generally to investment portfolio management and, more specifically, to providing a diversification index and determining maximum diversification in a portfolio of financial instruments.

BACKGROUND

In finance, the concept of diversification is applied to investment portfolios to mitigate risk of individual investment assets. A well-diversified portfolio will often have less overall risk than the weighted average risk of its constituent assets, and often less risk than the least risky of its constituent. Various strategies have been used to create highly diversified portfolios, yet determining the optimal balance of assets to achieve this is not straightforward.

When different assets are not uniformly uncorrelated, a weighting approach to asset allocation that accounts for their relative correlations can help to maximize the diversification. However, such methods are generally not applicable across different asset classes. In addition, these methods produce unbounded outcomes, making it difficult to compare different portfolios.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
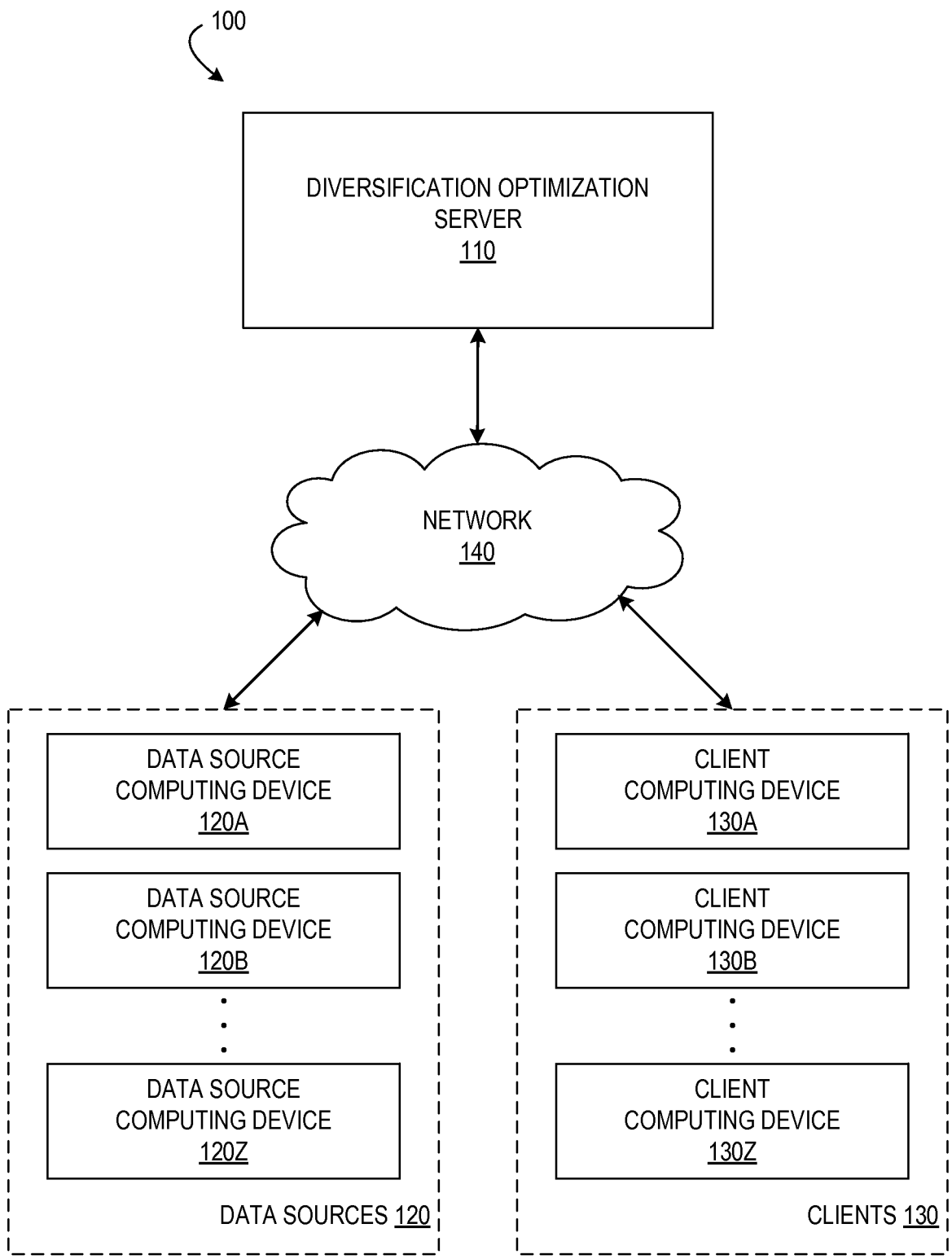
FIG. 1 is a block diagram illustrating an exemplary computer network in which embodiments of the present invention may operate.

Described herein are systems and methods for maximizing portfolio diversification. The diversification of a portfolio may be described by a diversification index, which is a quantitative and uniform measure of portfolio-level diversification applied to multi-asset space. In some embodiments, the diversification index is normalized to a range from zero to one, with a value of zero suggesting zero diversification benefits in the portfolio, and a value approaching one suggesting very high portfolio diversification.

The diversification index, as described herein, serves as a well-defined and meaningful measure of diversification. Specifically, when a portfolio allocation is at its most diversified, the value of the DI is equivalent to the value of 1 Asset-Portfolio Correlation (APC), where each constituent asset of the portfolio has the same APC as the overall portfolio, satisfying the property of correlation parity. This is meaningful intuitively since the portfolio is most diversified when no constituent asset is more or less correlated to the portfolio. Despite wide investor interest in the topic of diversification, to date there have been no uniform, transparent, and quantitative measures of portfolio diversification in the multi-asset space. The embodiments of the present invention address these issues.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions may be presented in terms of algorithms and symbolic representations of operations on data bits within a computer memory. These algorithmic descriptions and representations correspond to the terminology used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the description that follows, it is appreciated that throughout the description, discussions utilizing terms such as "receiving", "detecting", "monitoring", "generating", "calculating", "transmitting", "enrolling", "identifying", "measuring", "recommending", "designating", "increasing", "issuing", "processing", "optimizing", "maximizing", "minimizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relate to an apparatus for performing the operations herein. This apparatus may be specially constructed for the required purposes or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the relevant method steps. The structure for a variety of these systems will be apparent from the description that follows. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present invention may operate. Referring to FIG. 1, computer network 100 may include a computer-enabled diversification optimization server 110, a plurality of data source computing devices 120A-120Z, which are associated with and collectively referred to herein as data sources 120. Computer network 100 may also include a plurality of client computing devices 130A-130Z, which are associated with and may be collectively referred to herein as clients 130. Diversification optimization server 110 may be communicatively coupled directly or via a communications network 140. Data source computing devices 120A-120Z associated with data sources 120 may be communicatively coupled to communications network 140 via any one of a plurality of communication channels (e.g., e-mail, SMS service, automated voice message, etc.). Similarly, client computing devices 130A-130Z associated with clients 130 may also be communicatively coupled to communications network 140 via any one of the plurality of communication channels. Communications network 140 may be a private network (e.g., a local area network (LAN), wide area network (WAN), intranet, etc.), a public network (e.g., the Internet), a cellular network or any combination thereof.

Figure 2:
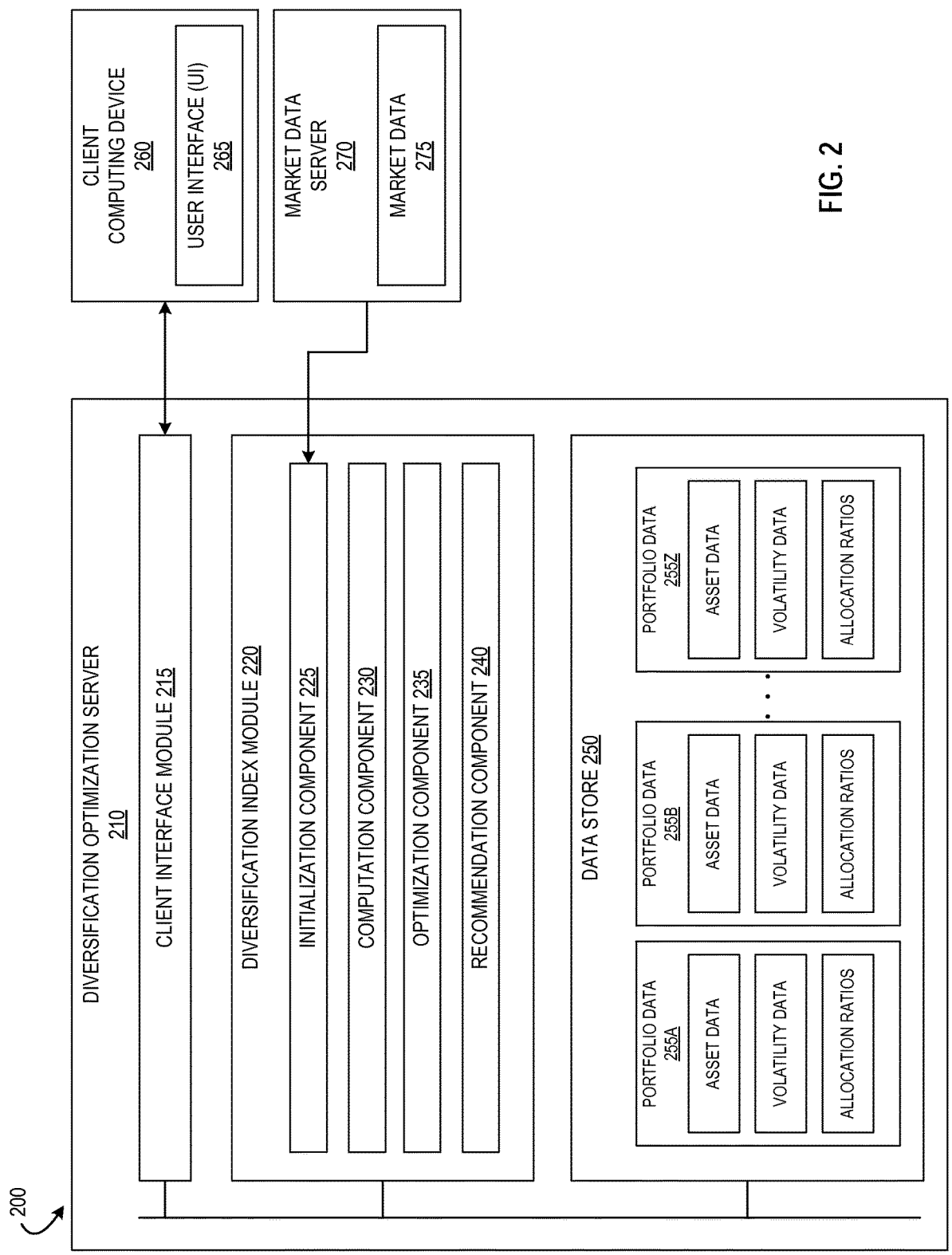
FIG. 2 is a block diagram illustrating an exemplary diversification optimization platform in accordance with an embodiment of the invention.

FIG. 2 is a block diagram illustrating an exemplary diversification optimization platform 200 in accordance with an embodiment of the invention. Diversification optimization platform 200 may include a diversification optimization server 210. Diversification optimization server 210 may be the same or similar to, and have the same functionality and connectivity as, diversification optimization server 110 described with respect to FIG. 1. Although diversification optimization server 210 is depicted as a single server, diversification optimization server 210 may be one or more computing devices (e.g., as a rackmount server, a router computer, a server computer, a personal computer, a mainframe computer, a laptop computer, a tablet computer, a desktop computer, etc.), and include one or more data stores (e.g., hard disks, memories, databases), networks, software components, and/or hardware components. In one embodiment, the functionality of diversification optimization platform 200 may be implemented on a client computing device (e.g., client computing device 260) and/or a data source computing device (e.g., market data server 270) in lieu of or in addition to diversification optimization server 210.

Diversification optimization server 210 may include one or more modules configured to generate and optimize a diversification index for a portfolio. Diversification optimization server 210 includes client interface module 215, diversification index module 220, and data store 250. The diversification index module 220 includes an initialization component 225, a computation component 230, an optimization component 235, and a recommendation component 240. More or less modules and components may be included in diversification optimization server 210 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.). In one embodiment, computation component 230 employs mathematical operations to compute diversification indices, in accordance with the embodiments described herein, as well as relevant parameters. Computation component 230 may also work in conjunction with optimization component 235 to employ numerical methods in determining portfolio parameters that maximize the computed diversification index.

In one embodiment, diversification optimization server 210 may maintain information related to one or more investment portfolios (e.g., which may be stored as portfolio data 255A-255Z in data store 250). An individual investor may be able to access his/her portfolio details from client computing device 260 using UI 265, and may be able view and/or update portfolio parameters using client interface module 215. The parameters may include, but are not limited to, asset data, volatility data, and allocation ratios for each asset. Some or all of these parameters may be provided by the investor directly or may be obtained from one or more data sources (e.g., market data server 270). These parameters are discussed in greater detail below with respect to FIGS. 3 and 4. The stored parameters may be retrieved from data store 250 by diversification index module 220 to generate a diversification index, determine an optimal diversification index (e.g., using a diversification maximization algorithm), and/or generate a recommended investment portfolio for the investor.

In one embodiment, initialization component 225 identifies parameters that may be used in generating a diversification index and maximizing a diversification index. In one embodiment, initialization component 225 may identify parameters by computing parameters and/or retrieving/receiving one or more parameters from a memory (e.g., data store 250), from client computing device 260 (e.g., by querying client computing device 260 and receiving input from an investor using UI 265), and/or from market data server 270.

In one embodiment, the data store 250 may be a memory (e.g., random access memory), a cache, a drive (e.g., a hard drive), a flash drive, a database system, or another type of component or device capable of storing data. The data store 250 may also include multiple storage components (e.g., multiple drives or multiple databases) that may also span multiple computing devices (e.g., multiple server computers), and may be cloud-based. In some embodiments, the data store 250 may be separate from diversification optimization server 210, and may be, for example, distributed among and accessible to client computing device 260 and market data server 270.

Figure 3:
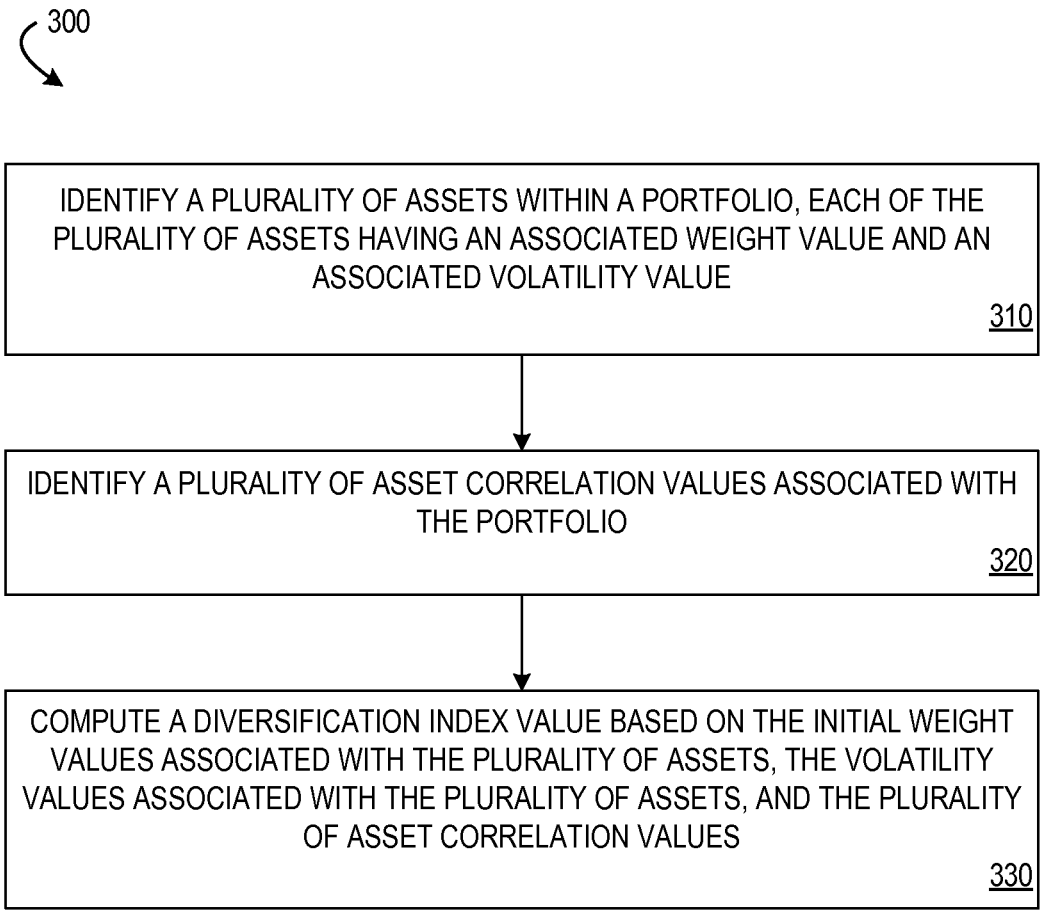
FIG. 3 is a flow diagram illustrating a method for generating a diversification index in accordance with an embodiment of the invention.

As illustrated in FIGS. 3 and 4, each of methods 300 and 400, respectively, may be performed by processing logic that may include hardware (e.g., circuitry, dedicated logic, programmable logic, microcode, etc.), software (such as instructions run on a processing device), or a combination thereof. In one embodiment, methods 300 and 400 may be performed by one or more processing components associated, respectively, with client interface module 215 and diversification index module 220 (which may include one or more of initialization component 225, computation component 230, optimization component 235, or recommendation component 240) of diversification optimization server 210.

FIG. 3 is a flow diagram illustrating a method 300 for generating a diversification index in accordance with an embodiment of the invention. In one embodiment, method 300 is executed by diversification index module 220 described with respect to FIG. 2. Method 300 may be initiated at block 310, in which a plurality of assets are identified within a portfolio. In one embodiment, each of the plurality of assets may be of a same asset class (e.g., equities, fixed-income, or cash equivalents). In another embodiment, one or more of the plurality of assets may be of different asset classes. For example, a first asset of the plurality of assets may be of a first asset class (e.g., an equity), and a second asset of the plurality of assets may be of a second asset class (e.g., a cash equivalent). Each of the plurality of assets have a corresponding weight value (e.g., an associated allocation ratio) and a corresponding volatility value (which may be based on historical market data). Information associated with the portfolio may have been provided to a diversification optimization server (e.g., diversification optimization server 210) from a client computing device (e.g., client computing device 260) or from another source. The information associated with the portfolio may contain information as to which assets and types of assets are included in the portfolio, a total value of the portfolio, allocations ratios for each of the assets, etc. The information may be stored on a data store (e.g., data store 250) that is accessible to the diversification optimization server. In some embodiments, the plurality of assets are identified by a client computing device.

At block 320, a plurality of asset correlation values associated with the portfolio is identified. The plurality of asset correlation values may contain correlation values between different pairs of assets, and may be used, for example, to compute an overall volatility value defined according to:

$$\sigma_P = \Sigma_i \sqrt{\Sigma_j w_i w_j \sigma_i \sigma_j \rho_{i,j}} \qquad \text{(Eq. 1)}$$

where:
the indices i and j range from 1 to N, with N being the number of different assets in the portfolio,
$w_i$ is a weight value (e.g., an allocation ratio) of a particular asset in the portfolio,
$\sigma_i$ is a volatility value of a particular asset in the portfolio, and
$\rho_{i,j}$ is a correlation coefficient between assets i and j, in which $\rho_{i,j}=1$ when i=j. Volatility data and correlation coefficients may be retrieved from a market data server (e.g., market data server 270). In one embodiment, the plurality of asset correlation values is identified by computing the plurality of asset correlation values (e.g., using computation component 230), which may be performed by any of the devices described herein (e.g., diversification optimization server 210, client computing device 260, etc.).

At block 330, a diversification index is computed based on the plurality of asset correlation values and the associated weight and volatility values of each of the plurality of assets (e.g., weight value #1 and volatility value 1 of asset #1, weight value #2 and volatility value #2 of asset #2, etc.), such that the diversification index is the ratio of the difference between an asset-weighted volatility and overall volatility value of the entire portfolio to the asset-weighted volatility. The asset-weighted volatility is calculated as a sum of products, each product being a product of respective weight and volatility values for each of the plurality of assets (e.g., the product of weight value #1 and volatility value #1, the product of weight value #2 and volatility value #2, etc.). The diversification index (DI) may be of the form:

$$DI = \frac{\sum_{i=1}^{N} w_i \sigma_i - \sigma_P}{\sum_{i=1}^{N} w_i \sigma_i} \qquad \text{(Eq. 2)}$$

where:
N is the number of different assets in the portfolio,
$w_i$ is a weight value (e.g., an allocation ratio) of a particular asset in the portfolio,
$\sigma_i$ is a volatility value of a particular asset in the portfolio, and
$\sigma_P$ is an overall volatility value of the entire portfolio.

It should be appreciated by one or ordinary skill in the art that block 330 may be executed in accordance with various embodiments. For example, block 330 may be executed after or concurrently with blocks 310 and 320, or may be combined with one or more of blocks 310 and 320. Similarly, block 320 may be performed before block 310 or concurrently with block 310.

As defined by Eq. 2, the diversification index includes two parts: a numerator that includes a difference between an asset-weighted volatility and a portfolio volatility, and a denominator that includes the asset-weighted volatility. Accordingly, the diversification index will be bounded within a pre-defined range of 0 to 1, with a value of zero (DI=0) being indicative of zero diversification, that is, when the summation of asset-weighed volatilities is the same as portfolio volatility. When the diversification index approaches a value of 1 (DI=1), the portfolio is at its maximum diversification and the portfolio volatility approaches zero. Mathematically, the smaller the overall portfolio volatility ($\sigma_P$) compared to the undiversified asset weighted volatility ($\Sigma_i w_i \sigma_i$), the larger the numerator becomes as a percent of denominator, resulting in an increased diversification index. It is noted that the diversification index is not limited to the Eq. 2, as other mathematical definitions may be used to quantify portfolio diversification.

There are several benefits of defining the diversification index according to Eq. 2. One benefit is that the diversification index can be applied to a heterogeneous portfolio of different assets, that is, the definition is asset class agnostic when it comes to the composition of underlying constituents of the portfolio. Another benefit is that the diversification index is uniform on a scale of zero to one, with a value of zero suggesting zero diversification benefit and a value approaching one suggesting maximum diversification. Having both of these features allow for comparison across different portfolios containing heterogeneous assets. Moreover, the diversification index has real-world applicability in portfolio construction and planning due to its bounded and asset-agnostic nature. In particular, a set of asset allocation that maximizes the diversification index can be identified, thus generating an asset mix with the highest diversification benefit given the underlying assets. Maximization of a diversification index may be performed via an optimization process that is discussed below with respect to FIGS. 4A and 4B.

Figure 4A:
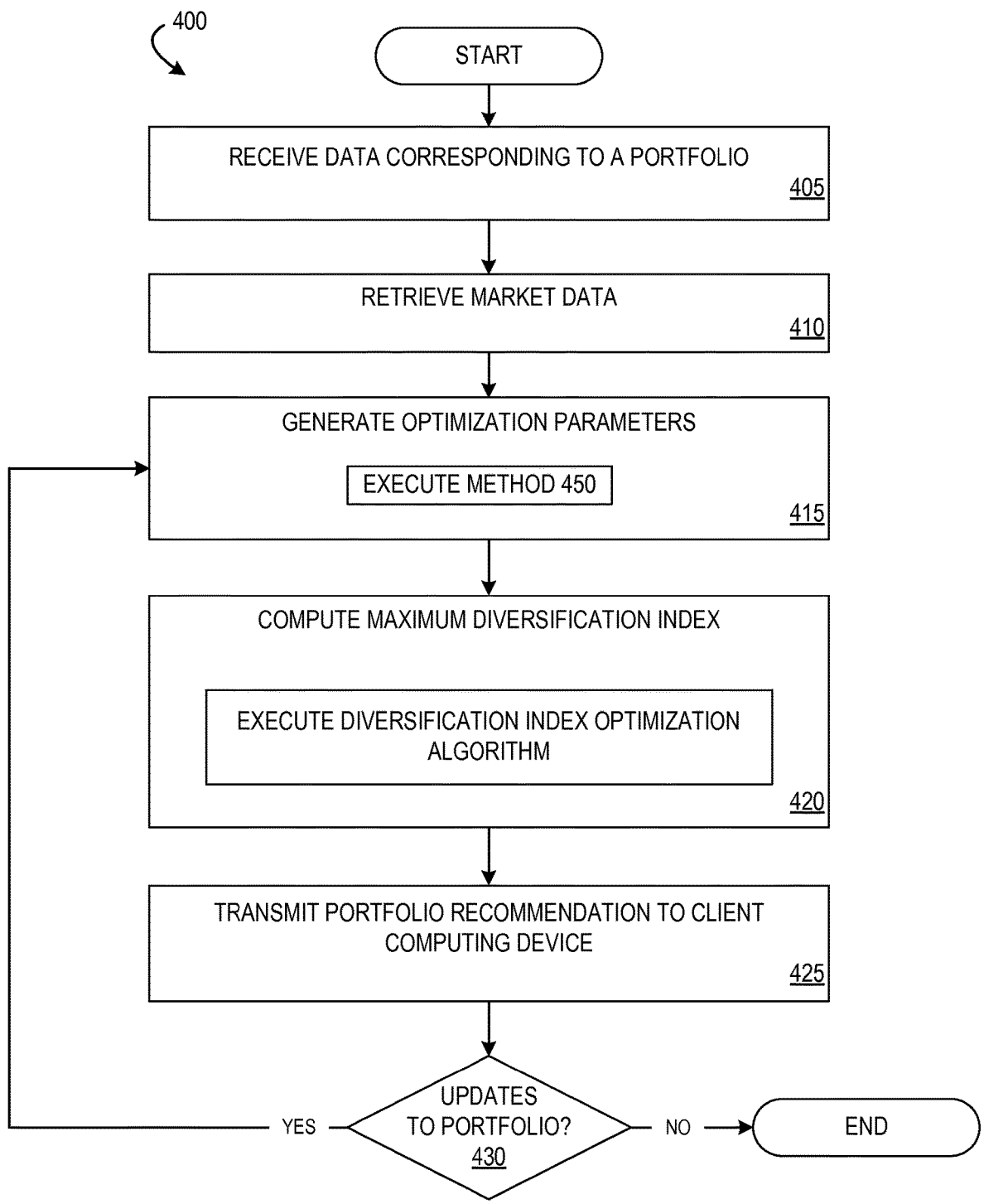
FIG. 4A is a flow diagram illustrating a method for optimizing a diversification index of a portfolio in accordance with an embodiment of the invention.

Reference is now made to FIG. 4A. FIG. 4A is a flow diagram illustrating a method 400 for optimizing a diversification index of a portfolio in accordance with an embodiment of the invention. Method 400 may be executed, for example, by diversification index module 220 described with regard to FIG. 2.

Method 400 may be initiated at block 405, in which data corresponding to a portfolio (referred to as the "current portfolio") is received. The data may be received from a client computing device (e.g., client computing device 260) by a diversification optimization server (e.g., diversification optimization server 210). For example, an investor may transmit information associated with his/her portfolio (e.g., asset data, allocation data, etc.) using a user interface of the client computing device (e.g., UI 265). In one embodiment, the user may transmit an indication to the diversification optimization server that he/she wishes to have a diversification index computed for his/her portfolio and/or receive a recommended portfolio. The diversification optimization server may receive (e.g., using client interface module 215) the portfolio information by retrieving the portfolio information from an internal or external data store (e.g., portfolio data 255A from data store 250 may correspond to the portfolio of the requesting investor). In one embodiment, the diversification optimization server may receive the portfolio data without receiving a communication from a client computing device. For example, the diversification optimization server may receive the data at pre-scheduled times. In some embodiments, the diversification optimization server may be omitted, and at least some of the functionality of the diversification optimization server may be implemented by the client computing device (e.g., diversification index module 220 may be implemented on client computing device 260). For example, the client computing device may receive the portfolio information directly via the user interface or from an internal or external data store.

At block 410, market data of constituent asset class returns for the portfolio is retrieved (e.g., market data 275 from market data server 270). For example, the market data may be retrieved by the diversification optimization server from a market data server via a communications network (e.g., communications network 140), and stored (e.g., using data store 250). Market data may include historical returns, risk data, volatility data, asset correlation data, etc. The market data may include data for a particular range of time (e.g., from the present to a number of months or years in the past). In one embodiment, market data for multiple assets is retrieved, in which the assets associated with the current portfolio represent a subset of the total assets represented by the retrieved market data. In one embodiment, only market data associated with the assets of the current portfolio is retrieved.

At block 415, optimization parameters are generated. In some embodiments, the optimization parameters are proposed weights of each of the plurality of assets, and may also be generated as outputs of the method 400. In some embodiments, the optimization parameters may have already been generated, and may have been stored (e.g., using data store 250) for later retrieval. If the optimization parameters have not been generated, or at least some of the optimization parameters have not been generated or are to be updated, method 450 is performed. Once each of the parameters are generated in accordance with method 450, the parameters may be stored for later use (e.g., using data store 250).

Figure 4B:
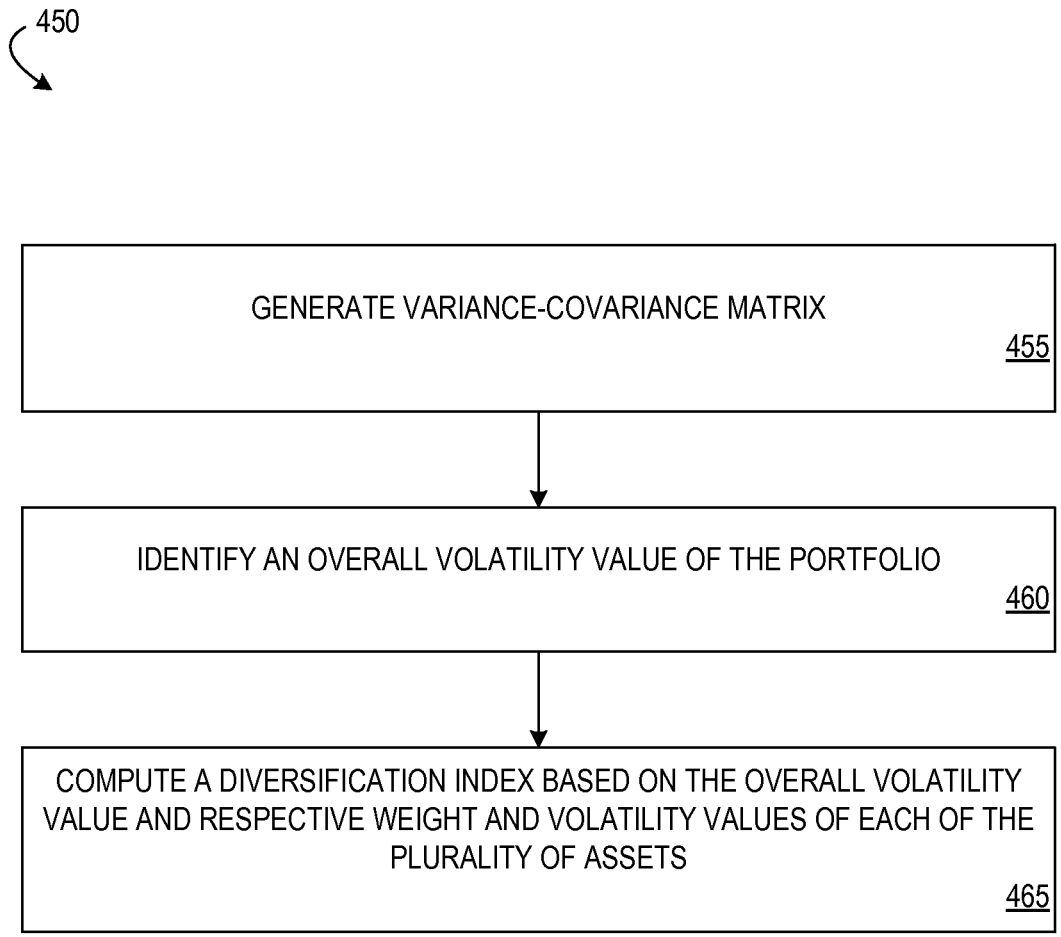
FIG. 4B is a flow diagram illustrating a method for generating optimization parameters in accordance with an embodiment of the invention.

Referring now to FIG. 4B, at block 455, a variance-covariance matrix is generated (e.g., as an input for an optimization algorithm). The variance-covariance matrix may be a square matrix having variance values along its diagonal (with each variance value corresponding to a variance of one of the assets of the portfolio), and covariance values in its off-diagonals (corresponding to a correlation between different assets).

In one implementation, an n-by-n variance-covariance matrix for a portfolio of n assets is defined according to:

$$\sum = \begin{bmatrix} \sigma_1^2 & \rho_{1,2}\sigma_1\sigma_2 & \cdots & \rho_{1,n}\sigma_1\sigma_n \\ \rho_{2,1}\sigma_2\sigma_1 & \sigma_2^2 & \cdots & \rho_{2,n}\sigma_2\sigma_n \\ \cdots & \cdots & \ddots & \cdots \\ \rho_{n,1}\sigma_n\sigma_1 & \rho_{n,2}\sigma_n\sigma_2 & \cdots & \sigma_n^2 \end{bmatrix} \quad \text{(Eq. 3)}$$

At block 460, an overall utility value of the portfolio is identified. Block 460 may be performed in a similar manner as described with respect to block 320 of FIG. 3. The overall volatility can be expressed as:

$$\sigma_P = \text{sqrt}(W^* \Sigma^* W) \quad \text{(Eq. 4)}$$

where W denotes the asset weights.

Referring back to Eq. 2, the denominator of the ratio relates to the diagonal elements, namely, the individual volatilities of the constituent assets, weighted by the allocations, and thus is an undiversified sum of volatilities. The numerator of the ratio considers the magnitude of the diversification by taking the difference between the diagonal elements and the entire covariance matrix, and thus relates to the off-diagonal elements, that is, the correlations of the constituent assets. Empirical evidence suggests that correlations are more important than individual volatilities when examining portfolio diversification.

At block 465, a diversification index is computed based on the overall volatility value (e.g., computed based at least partially on a plurality of asset correlation values) and respective weight and volatility values of each of the plurality of assets. In one embodiment, the diversification index is the ratio of the difference between an asset-weighted volatility and overall volatility of the portfolio to the asset-weighted volatility. The asset-weighted volatility can be expressed in terms of the weights and variance-covariance matrix according to:

$$\Sigma_i w_i \sigma_i \Sigma_i w_i * \text{sqrt(diagonal elements)} \quad \text{(Eq. 5)}$$

The diversification index may be computed in a similar manner as described with respect to block 330 of FIG. 3.

Referring back to FIG. 4A, at block 420, the maximum diversification index is computed. The maximum diversification index (MDI) may be of the form:

$$\text{MDI} = \max(\text{DI} + \lambda \Sigma (w_i - w_0)^2) \quad \text{(Eq. 6)}$$

where:
DI is the diversification index of the portfolio computed in accordance with Eq. 2,
$w_i$ is a weight value (e.g., an allocation ratio) of a particular asset in the portfolio,
$w_0$ is a pre-defined/initial weight value of a particular asset, and
$\lambda$ is a factor to balance maximization of DI and penalization of the differences between $w_i$ and $w_0$. The MDI may be computed numerically with a diversification maximization algorithm (e.g., using optimization component 235) by any of the devices described herein (e.g., diversification optimization server 210, client computing device 260, etc.). The resulting diversification index values lead to the MDI, which is a set of final weight values (e.g., optimal asset allocation ratios) that correspond to the maximum diversification of the portfolio.

At block 425, a portfolio recommendation is transmitted to a client computing device (e.g., transmitted from diversification optimization server 210 to client computing device 260 of an investor). The recommended portfolio may include one or more of the MDI for the portfolio or recommended allocation ratios for each of the assets of the portfolio. In one embodiment, the recommended allocation ratios correspond to optimal weight values (e.g., initial or pre-defined weight values that were updated by the diversification maximization algorithm to maximize the diversification index of the portfolio). For example, the investor may receive at his/her client computing device (e.g., client computing device 260) the recommended allocation ratios corresponding to volatility data determined over a duration of time (e.g., over 6 months, a year, two years, etc.). The recommended portfolio may be presented to the investor with a UI of the client computing device (e.g., UI 265). In one embodiment, data corresponding to other diversification strategies may be transmitted to the client computing device to provide comparisons between the recommended portfolio for varying situations and circumstances. For example, the diversification index module may generate one or more diversification indices corresponding to allocation strategies determined by different portfolio strategies. The data received by the client computing device may generate (e.g., using UI 265) a comparison of the diversification indices of the other allocations strategies to the diversification index of an allocation strategy determined in accordance with the embodiments described herein.

At block 430, a determination is made as to whether updates were or will be made to the portfolio. In one embodiment, a determination may be made as to whether a portfolio of an investor has changed (e.g., whether new assets have been added, assets have been removed, the allocations have been changed, etc.). In one embodiment, the investor may indicate, using the client computing device (e.g., client computing device 260), that he/she wishes to update the parameters associated with the portfolio. The method 300 may then dynamically update stored information associated with the portfolio. In one embodiment, if assets and/or asset classes are added to or removed from the portfolio, method 400 may perform block 415 (as illustrated in FIG. 4A), in which a new MDI is computed and new optimal allocation ratios are determined (e.g., by diversification index module 220). In other embodiments, method 400 may perform one or more of blocks 405, 410, or 415 in any suitable order in response to determining that updates to the portfolio are to be performed at block 430.

In one embodiment, the diversification optimization server may automatically determine whether a new MDI is to be computed. For example, the diversification optimization server may (in addition to the functions described with respect to FIG. 2) provide portfolio maintenance functionality for one or more investors. The diversification optimization server may determine that changes have been made to an investor's portfolio without receiving an indication directly from the investor. As another example, the diversification optimization server may receive updated market data (e.g., from market data server 270), which may serve as an indication to generate a new MDI for one or more portfolios.

If, at block 430, it is determined that the portfolio is not to be updated, method 400 ends, and may repeat continuously. For example, method 400 may be repeated by the diversification optimization server at regularly scheduled intervals, which may correspond to a weekly, bi-weekly, monthly, bi-monthly, etc. schedule, and/or may correspond to times in which updated market data becomes available (e.g., from market data server 270).

It should be noted that the sequence of operations described in conjunction with methods 300, 400, and 450 may be different from that illustrated, respectively, in corresponding FIGS. 3 and 4, while some operations may be omitted without departing from the nature of the embodiments described herein. It should be appreciated by one of ordinary skill in the art that the blocks illustrated in methods 300, 400, and 450 are provided for purposes of illustrating embodiments of the invention and are in no way intended to be limiting in scope.

Figure 5A:
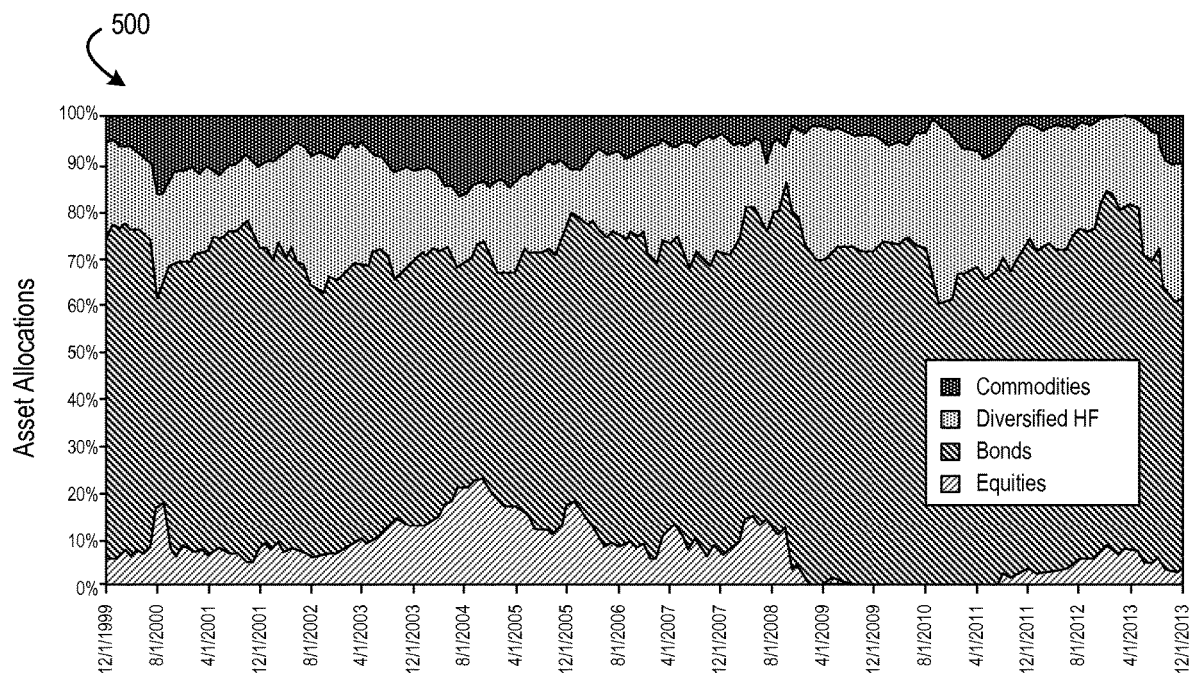
FIG. 5A is a plot illustrating asset allocation over time for assets of an example portfolio allocated in accordance with an embodiment of the invention.
Figure 5B:
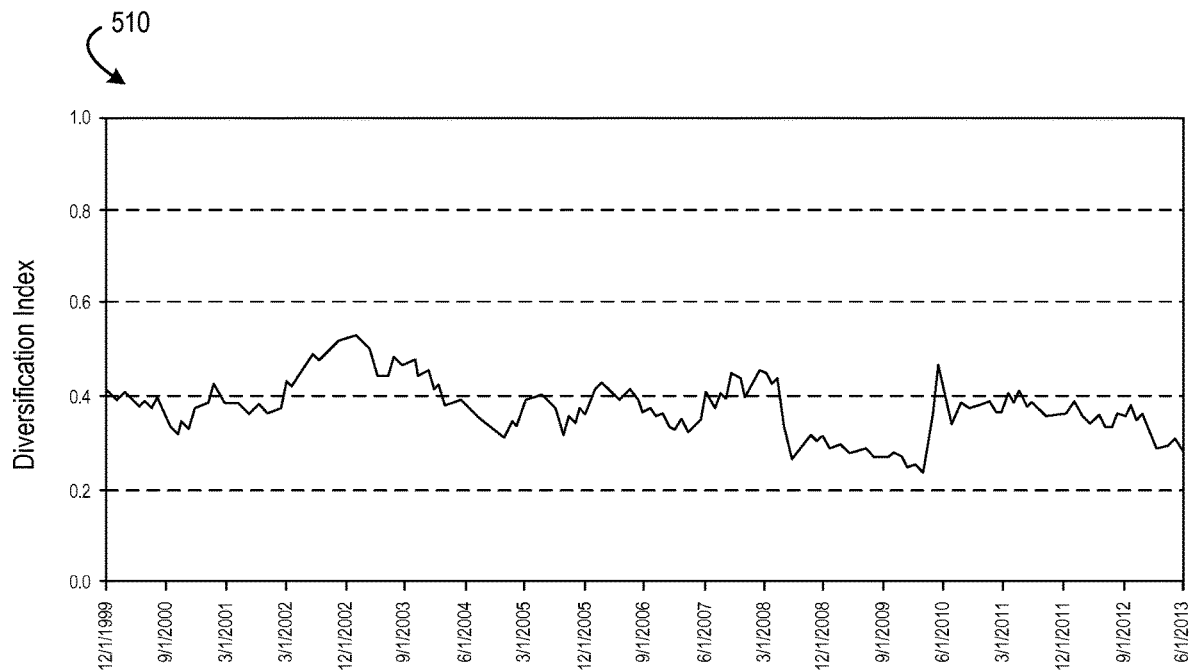
FIG. 5B is a plot illustrating a diversification index of the example portfolio over time in accordance with an embodiment of the invention.

FIG. 5A is a plot 500 illustrating asset allocation over time for assets of an example portfolio allocated in accordance with an embodiment of the invention, and FIG. 5B is a plot 510 illustrating the corresponding diversification index for the example portfolio. The example portfolio contains a total of four different assets: an equity index, a bond index, a diversified hedge fund (HF) index, and a commodity index. Each point of plots 500 and 510 correspond to a portfolio for which the asset allocation ratios have been optimized to maximize the diversification index, in accordance with an embodiment of the invention. In addition, the parameters used to compute the asset allocation ratios for each point are based on market data averages taken over a two-year period prior to each point. Thus, the fluctuations in the asset allocation ratios over time are due to the changes in returns and risk of the assets over time. Table 1 lists, for a particular point in time (January of 2014), an average returns and volatility values for each asset, as well as correlation values between each asset. Table 2 lists elements of a variance-covariance matrix that were estimated based on data from Table 1. Both Tables 1 and 2 correspond to return, volatility, and correlation data estimated over a two-year period (e.g., January of 2012 to December of 2013) prior to January of 2014, however, other periods may be used, such as six months, one year, three years, etc.

TABLE 1

Input parameters for
diversification index maximization algorithm

|  | Equity Index | Bond Index | Diversified HF Index | Commodity Index |
|---|---|---|---|---|
| Average Return | 1.7% | 0.2% | 0.5% | −0.4% |
| Volatility | 3.2% | 0.7% | 0.9% | 3.6% |
| Correlation |  |  |  |  |
| Equity Index | 1.00 |  |  |  |
| Bond Index | 0.10 | 1.00 |  |  |
| Diversified HF Index | 0.78 | 0.21 | 1.00 |  |
| Commodity Index | 0.60 | 0.04 | 0.40 | 1.00 |

TABLE 2

Variance-Covariance matrix estimated from input parameters

| Variance-Covariance | Equity Index | Bond Index | Diversified HF Index | Commodity Index |
|---|---|---|---|---|
| Equity Index | 0.00102 |  |  |  |
| Bond Index | 0.00002 | 0.00005 |  |  |
| Diversified HF Index | 0.00021 | 0.00001 | 0.00007 |  |
| Commodity Index | 0.00068 | 0.00001 | 0.00012 | 0.00126 |

Figure 5C:
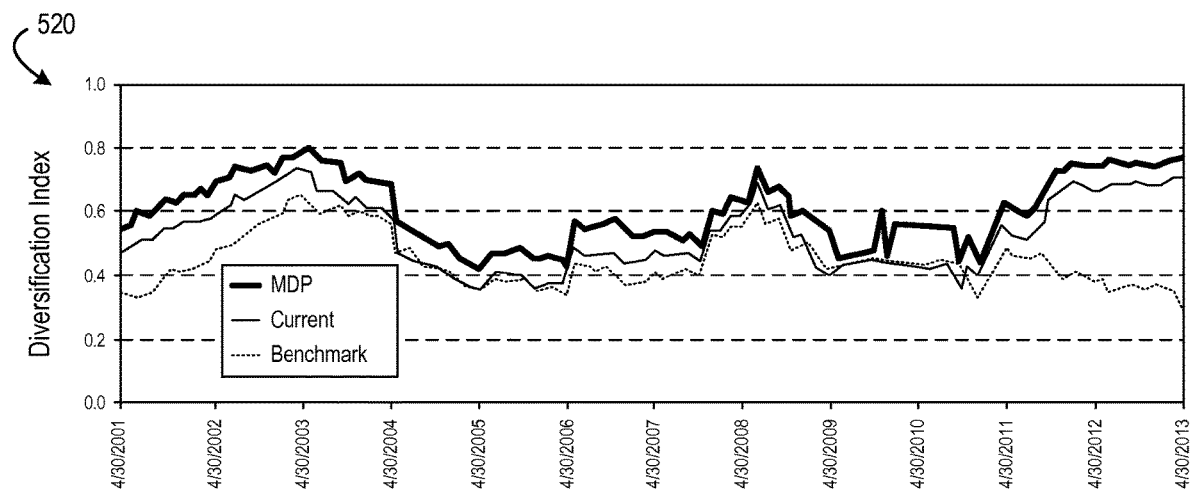
FIG. 5C is a plot illustrating diversification indices computed according to embodiment of the invention for different portfolio strategies.
Figure 5D:
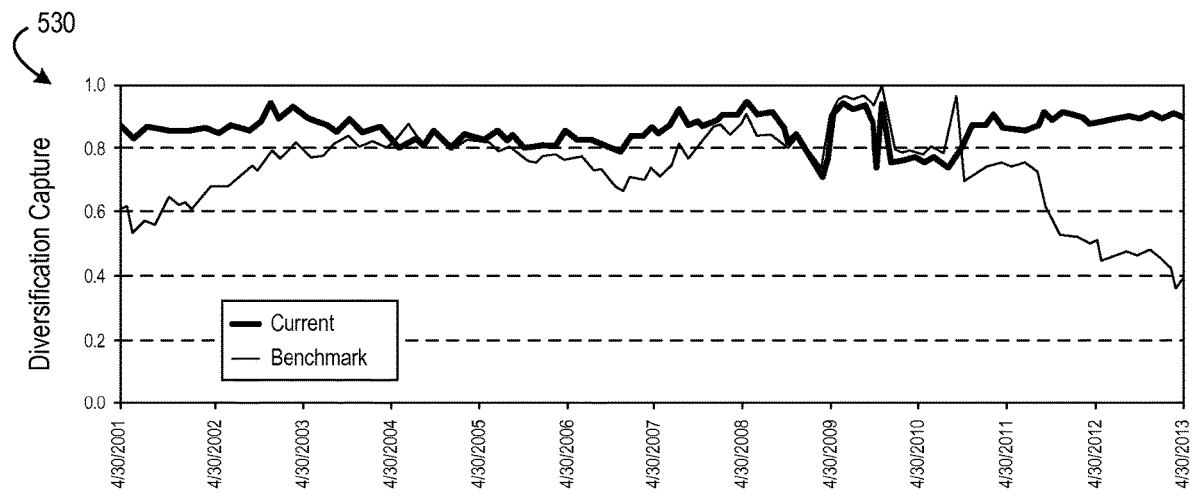
FIG. 5D is a plot illustrating diversification capture computed according to an embodiment of the invention for different portfolio strategies.

FIG. 5C is a plot 520 illustrating diversification indices computed according to embodiment of the invention for different portfolio strategies. As indicated, the MDP results in a higher diversification index than when the diversification index is computed for the current and benchmark strategies. FIG. 5D is a plot 530 of diversification capture, in which the diversification capture for the current investment vehicle strategies and benchmark strategies from plot 520 are normalized to the MDP, illustrating that these strategies often fail to maximize portfolio diversification as defined in accordance with the implementations described herein.

Figure 6:
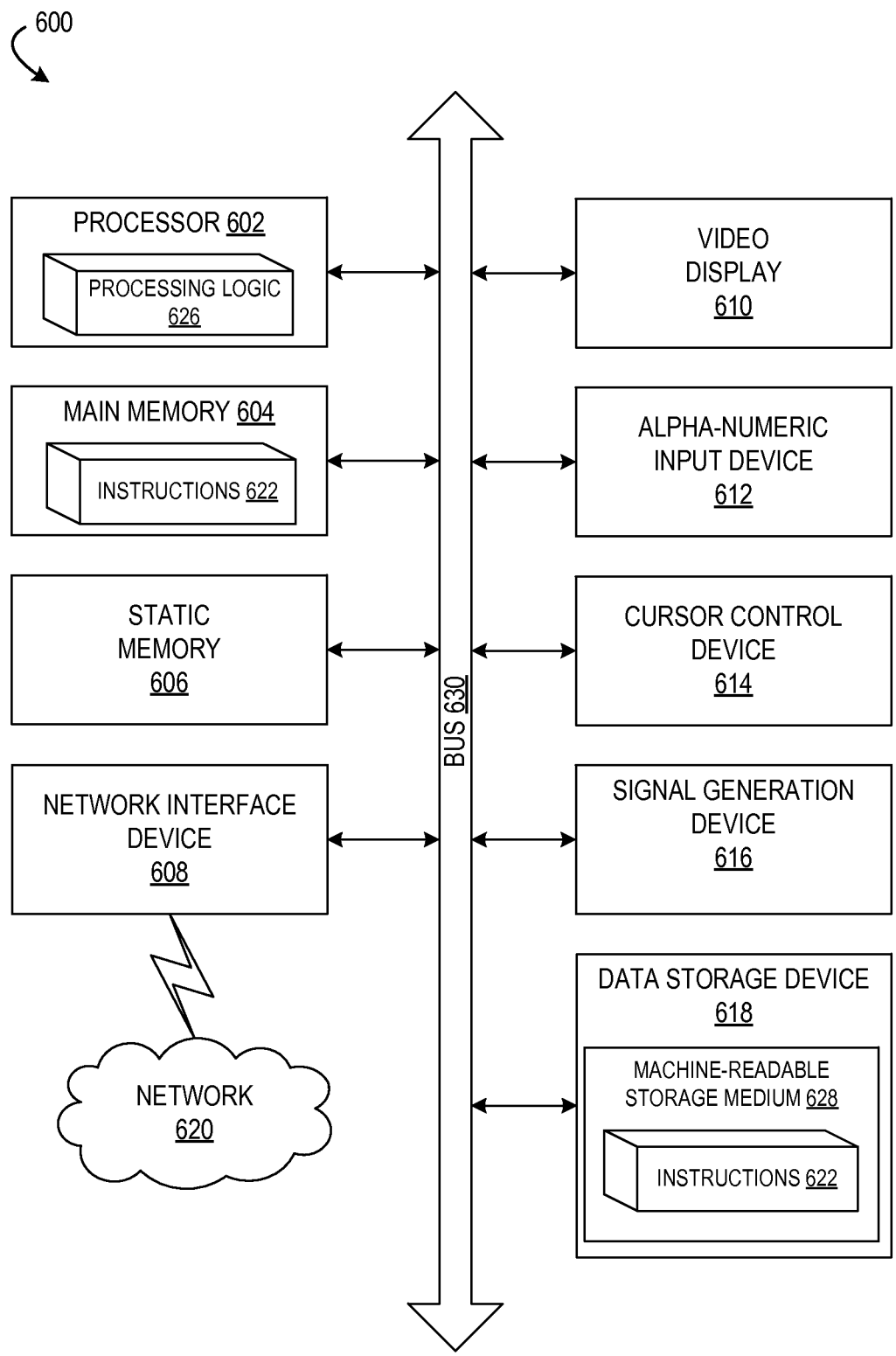
FIG. 6 illustrates a diagrammatic representation of a machine in the exemplary form of a computer system configured to perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 may include a processor 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute processing logic 426 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium 628 (or more specifically a computer-readable storage medium) having one or more sets of instructions (e.g., software 622) embodying any one or more of the methodologies of functions described herein. For example, software 622 may store instructions to generate a maximum diversification index. Software 622 may also reside, completely or at least partially, within main memory 604 and/or within processor 602 during execution thereof by computer system 600; main memory 604 and processor 602 also constituting machine-readable storage media. Software 622 may further be transmitted or received over a network 620 via network interface device 608.

Machine-readable storage medium 628 may also be used to store instructions to generate a maximum diversification index. While machine-readable storage medium 628 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instruction for execution by the machine and that causes the machine to perform any one or more of the methodologies of the present invention. The term "machine-readable medium" shall also be taken to include, but not be limited to, transitory machine-readable media, including, but not limited to, propagating electrical or electromagnetic signals. The term "machine-readable medium" shall also be taken to include non-transitory machine-readable storage media including, but not limited to, volatile and non-volatile computer memory or storage devices such as a hard disk, solid-state memory, optical media, magnetic media, floppy disk, USB drive, DVD, CD, media cards, register memory, processor caches, random access memory (RAM), etc.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite those features regarded as the invention.

What is claimed is:

1. A method, comprising:

receiving, through a user interface of a first server, information pertaining to a portfolio transmitted over a first public communication network including the Internet, from a user computing device having a user interface;

identifying, by the first server, a plurality of assets within the portfolio, each of the plurality of assets having an associated initial weight value and an associated volatility value;

retrieving portfolio information, including a plurality of value asset correlation values associated with the portfolio, from a second server by communicating with the second server over the first public communication network, including the Internet;

storing the retrieved portfolio information in a data store, by the first server communicating with the data store over a second private communication network, different from the first public communication network;

identifying, by the first server, a plurality of value asset correlation values associated with the portfolio;

first determining, by the first server, an overall volatility value representing a portfolio volatility;

second determining, by the first server, an initial value of a diversification index based on the initial weight values associated with the plurality of assets, the volatility values associated with the plurality of assets, the plurality of asset correlation values, and the portfolio volatility, the diversification index represented by a ratio of a difference between an asset-weighted volatility and the portfolio volatility to the asset weight volatility;

optimizing, by the first server, the initial weight values to identify a final weight value for each of the plurality of assets;

third determining, by the first server, a final value of the diversification index based on the final weight values associated with the plurality of assets, the volatility values associated with the plurality of assets, and the plurality of asset correlation values;

fourth determining, by the first server, that the final value of the diversification index maximizes the diversification index, and represents a maximum diversification index;

in response to the fourth determining, generating a portfolio recommendation based on the final weight values;

transmitting the portfolio recommendation through the user interface of the first server over the first public communication network, including the Internet, to the user computing device associated with the portfolio and presenting the portfolio recommendations to a user of the user computing device via the user interface;

monitoring the portfolio for changes, by the first server, by periodically retrieving market data from the second server over the first public communication network, including the Internet, and automatically identifying conditions for recalculation of the maximum diversification index;

fifth determining, by the first server, an updated maximum diversification index when the conditions are detected, wherein the conditions include executing the fifth determining at a combination of predetermined scheduled time intervals and at predetermined occurrences of predetermined events; and selectively initiating independent decision-making control by the first server, without direct user instructions from the user computing device, based on the fifth determining.

2. The method of claim 1, wherein the final value of the diversification index is bounded within a pre-defined range.

3. The method of claim 2, wherein the pre-defined range is a range from 0 to 1.

4. The method of claim 1, wherein the portfolio recommendations comprises each of the final weight values as an optimal allocation ratio associated with a respective asset of the plurality of assets.

5. The method of claim 1, wherein a first asset of the plurality of assets is of a first asset class, and a second asset of the plurality of assets is of a second asset class that is different from the first asset class.

6. The method of claim 1, further comprising:

determining, by the first server, a variance-covariance matrix based on the associated volatility values of each of the plurality of assets and based on the plurality of asset correlation values, wherein the initial value of the diversification index and the final value of the diversification index are computed based at least in part on the variance-covariance matrix.

7. The method of claim 1, further comprising:

receiving, from the user computing device, data relating to the portfolio prior to identifying the plurality of assets within the portfolio.

8. The method of claim 1, wherein identifying the plurality of asset correlation values comprises computing each of the plurality of asset correlation values based on market data associated with each of the plurality of assets.

9. The method of claim 1, wherein the initial weight values associated with of each of the plurality of assets are pre-defined weight values, and wherein the method further comprises receiving the pre-defined weight values from a client computing device of an investor.

10. A system, comprising:

a first server, which includes a processing device and a memory;

a second server, which acquires and stores market data;

a user computing device, including a user interface;

a data store that stores portfolio data; and a first public communication network, including the Internet, which interconnects the first server, the second server, and the user computing device;

a second private communication network, different from the first public communication network, which interconnects the first server with the data store;

wherein the data store is accessible to the first server via the second private communication network, the data store storing instructions and information pertaining to at least one portfolio transmitted over the first public communication network, including the Internet, from the user computing device to the first server, and then transmitted from the first server over the second private communication network from the first server to the data store; and wherein the first server operates to receive through a user interface of the first server, the information pertaining to the at least one portfolio transmitted over the first public communication network from the user computing device;
identify a plurality of assets within a portfolio, each of the plurality of assets having an associated initial weight value and an associated volatility value;
retrieve portfolio information, including a plurality of value asset correlation values associated with the portfolio, from a market data server by communicating with the second server over the first public communication network, including the Internet;
store the retrieved portfolio information in the data store, by the first server communicating with the data store over the second private communication network;
identify a plurality of asset correlation values associated with the portfolio;
determine an overall volatility value representing a portfolio volatility;
determine an initial value of a diversification index based on the initial weight values associated with the plurality of assets, the volatility values associated with the plurality of assets, the plurality of asset correlation values and the portfolio volatility, the diversification index represented by the ratio of a difference between an asset-weighted volatility and the portfolio volatility to the asset weighted volatility;
optimize the initial weight values to identify a final weight value for each of the plurality of assets;
determine a final value of the diversification index based on the final weight values associated with the plurality of assets, the volatility values associated with the plurality of assets, and the plurality of asset correlation values;
determine that the final value of the diversification index maximizes the diversification index and represents a maximum diversification index;
generate a portfolio recommendation based on the final weight values in response to the determination;
transmit the portfolio recommendation through the user interface of the first server over the first public communication network, including the Internet, to the user computing device associated with the portfolio and presenting the portfolio recommendations to a user of the user computing device via the user interface;
monitor the portfolio for changes, by the first server, by periodically retrieving market data from the second server over the first public communication network, including the Internet, and automatically identifying conditions for re-calculation of the maximum diversification index;
determine an updated maximum diversification index when the conditions are detected,
wherein the conditions include a combination of predetermined scheduled time intervals and predetermined occurrences of predetermined events; and
selectively initiating independent decision-making control by the first server, without direct user instructions from the user computing device, based on a predetermined updated maximum diversification index.

11. The system of claim 10,
wherein the final value of the diversification index is bounded within a pre-defined range.

12. The system of claim 11,
wherein the pre-defined range is a range from 0 to 1.

13. The system of claim 10,
wherein the portfolio recommendation comprises each of the final weight values as an optimal allocation ratio associated with a respective asset of the plurality of assets.

14. The system of claim 10,
wherein a first asset of the plurality of assets is of a first asset class, and a second asset of the plurality of assets is of a second asset class that is different from the first asset class.

15. The system of claim 10,
wherein the first server further determines a variance-covariance matrix based on the associated volatility values of each of the plurality of assets and based on the plurality of asset correlation values, wherein the initial value of the diversification index and the final value of the diversification index are determined based at least in part on the variance-covariance matrix.

16. A non-transitory machine-readable medium having instructions encoded thereon, wherein when executed by a processing device cause the processing device to maximize diversification and perform operations, comprising:
receiving, through a user interface of a first server, information pertaining to a portfolio transmitted over a first public communication network, including the Internet, from a user computer device;
identifying, by the first server, a plurality of assets within the portfolio, each of the plurality of assets having an associated initial weight value and an associated volatility value;
retrieving portfolio information, including a plurality of value asset correlation values associated with the portfolio, from a second server by communicating with the second server over the first public communication network, including the Internet;
storing the retrieved portfolio information in a data store, by the first server communicating with the data store over a second private communication network, different from the first public communication network;
identifying, by the first server, a plurality of asset correlation values associated with the portfolio;
first determining, by the first server, an overall volatility value representing a portfolio volatility;
second determining, by the first server, an initial value of a diversification index based on the initial weight values associated with the plurality of assets, the volatility values associated with the plurality of assets, the plurality of asset correlation values, and the portfolio volatility, the diversification index represented by a ratio of a difference between an asset-weighted volatility and the portfolio volatility to the asset weighted volatility;
optimizing, by the first server, the initial weight values to identify a final weight value for each of the plurality of assets;
third determining, by the first server, a final value of the diversification index based on the final weight values associated with the plurality of assets, the volatility values associated with the plurality of assets, and the plurality of asset correlation values;
fourth determining, by the first server, that the final value of the diversification index maximizes the diversification index and represents a maximum diversification index;
in response to the fourth determining, generating a portfolio recommendation based on the final weight values;

transmitting the portfolio recommendation through the user interface of the first server over the first public communication network, including the Internet, to the user computing device associated with the portfolio and presenting the portfolio recommendations to a user of the user computing device via the user interface;

monitoring the portfolio for changes, by the first server, by periodically retrieving market data from the second server over the first public communication network, including the Internet, and automatically identifying conditions for recalculation of the maximum diversification index;

fifth determining, by the first server, an updated maximum diversification index when the conditions are detected, wherein the conditions include executing the fifth determining at a combination of predetermined scheduled time intervals and at predetermined occurrences of predetermined events; and selectively initiating independent decision-making control by the first server, without direct user instructions from the user computing device, based on the fifth determining.

17. The non-transitory machine-readable medium of claim 16, wherein the final value of the diversification index is bounded within a range from 0 to 1.

18. The non-transitory machine-readable medium of claim 16, wherein a first asset of the plurality of assets is of a first asset class, and a second asset of the plurality of assets is of a second asset class that is different from the first asset class.

* * * * *